(No Model.) A. FRAGER. ELECTRIC METER.

5 Sheets—Sheet 1.

No. 428,084. Patented May 20, 1890.

Witnesses:
John Becker
Fred White

Inventor.
Alphonse Frager,
By his Attorneys
Arthur C. Fraser & Co.

(No Model.)

5 Sheets—Sheet 2.

A. FRAGER.
ELECTRIC METER.

No. 428,084.  Patented May 20, 1890.

Witnesses:
John Becker
Fred White

Inventor:
Alphonse Frager,
By his Attorneys:
Arthur C. Fraser & Co.

(No Model.) 5 Sheets—Sheet 3.
A. FRAGER.
ELECTRIC METER.
No. 428,084. Patented May 20, 1890.
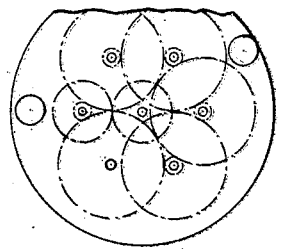
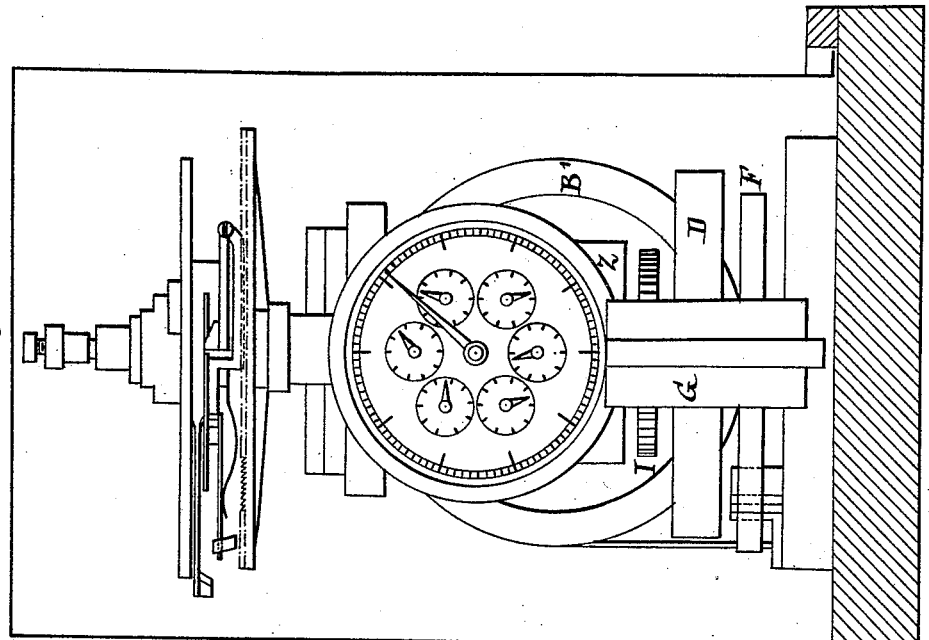
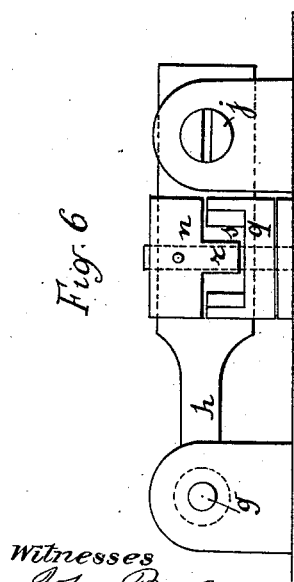
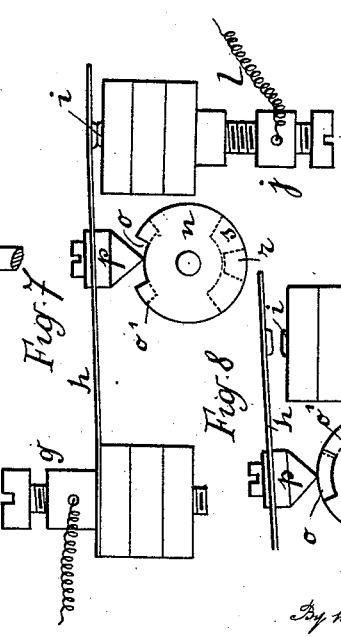
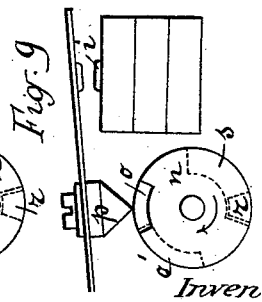
Witnesses
John Becker
Fred White
Inventor:
Alphonse Frager,
By his Attorneys
Arthur C. Fraser & Co.

(No Model.) 5 Sheets—Sheet 4.
A. FRAGER.
ELECTRIC METER.
No. 428,084. Patented May 20, 1890.
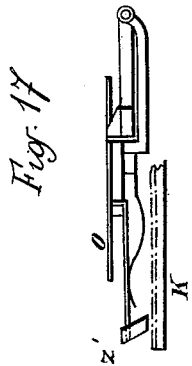
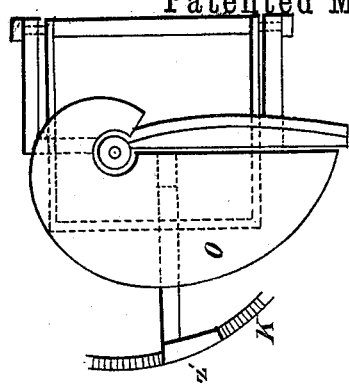
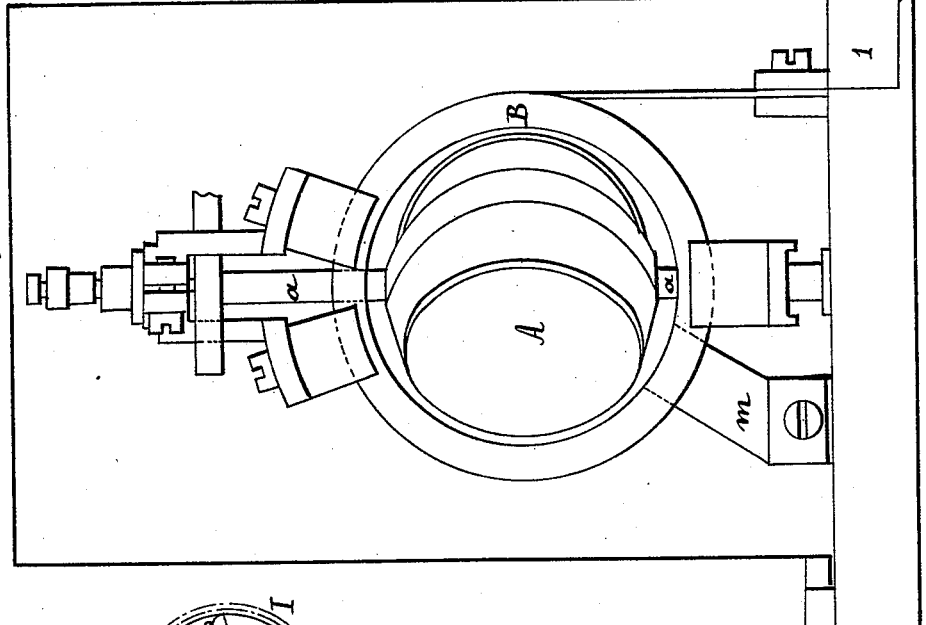
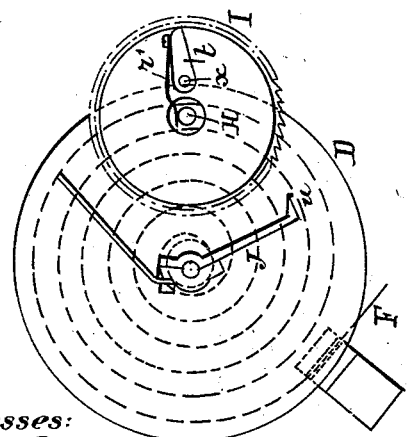
Witnesses:
John Becker
Fred White
Inventor:
Alphonse Frager
By his Attorneys:
Arthur C. Fraser & Co.

(No Model.) 5 Sheets—Sheet 5.
A. FRAGER.
ELECTRIC METER.
No. 428,084. Patented May 20, 1890.
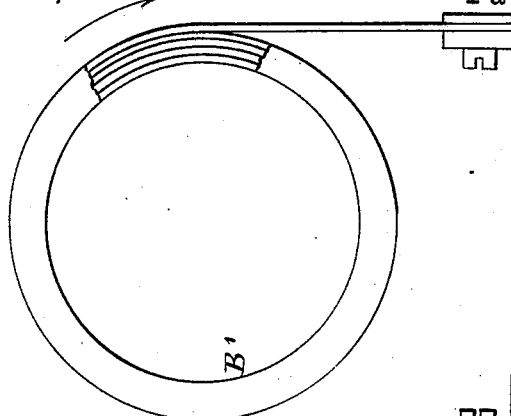
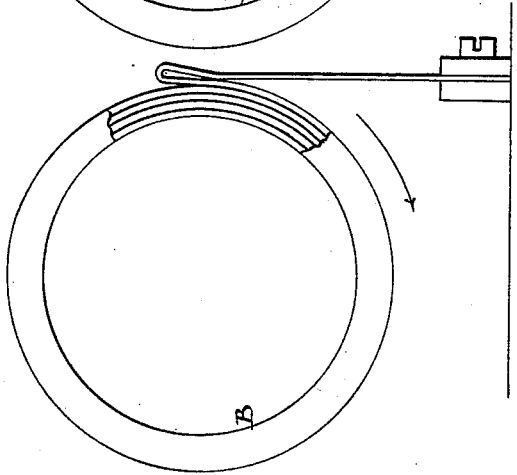
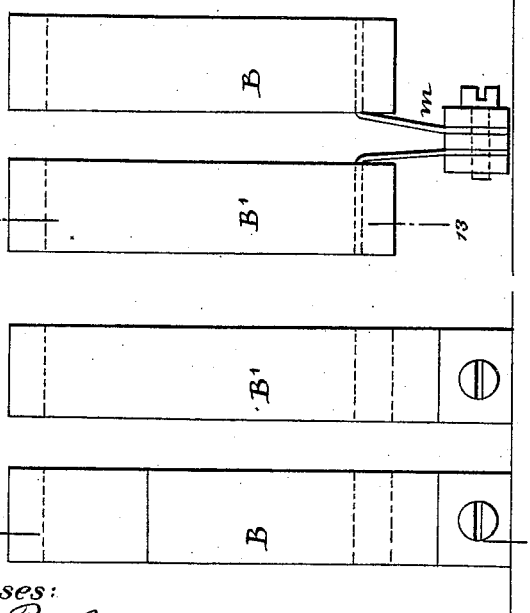
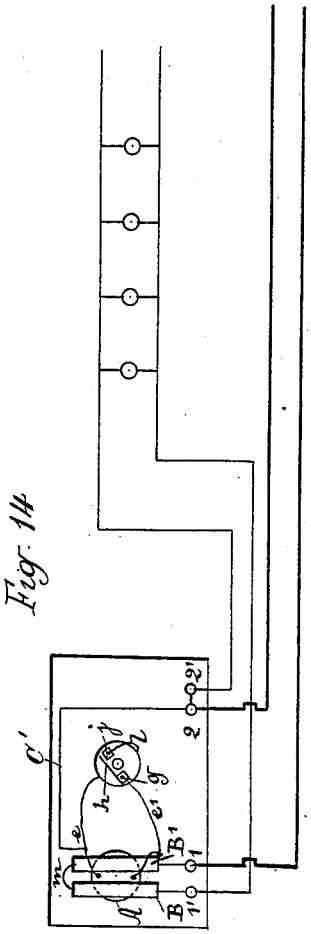
Witnesses:
John Becker
Fred White
Inventor:
Alphonse Frager,
By his Attorneys
Arthur C. Fraser & Co.

UNITED STATES PATENT OFFICE.

ALPHONSE FRAGER, OF PARIS, FRANCE.

ELECTRIC METER.

SPECIFICATION forming part of Letters Patent No. 428,084, dated May 20, 1890.

Application filed January 29, 1890. Serial No. 338,540. (No model.) Patented in France January 29, 1889, No. 195,713.

*To all whom it may concern:*

Be it known that I, ALPHONSE FRAGER, a citizen of the Republic of France, residing in Paris, France, have invented certain new and useful Improvements in Electric Meters, of which the following is a specification.

This invention is patented in France by Certificates of Addition to the French Patent No. 195,713, dated January 29, 1889, said Certificates of Addition being dated, respectively, June 26, 1889, August 5, 1889, September 23, 1889, and December 13, 1889.

My present invention is an improvement on the electric meter patented to me in the United States, December 31, 1889, No. 418,559. As in my original apparatus shown in that patent, my improved meter is of that class comprising, first, an electro-dynamometer which indicates at each instant the electrical energy consumed per second; second, a clock-work, which measures time and marks off the intervals at which the energy is registered, and, third, a registering apparatus, which at at each of such intervals counts up the consumption of energy indicated by the electro-dynamometer, and indicates on dials the total energy consumed.

Figure 1:
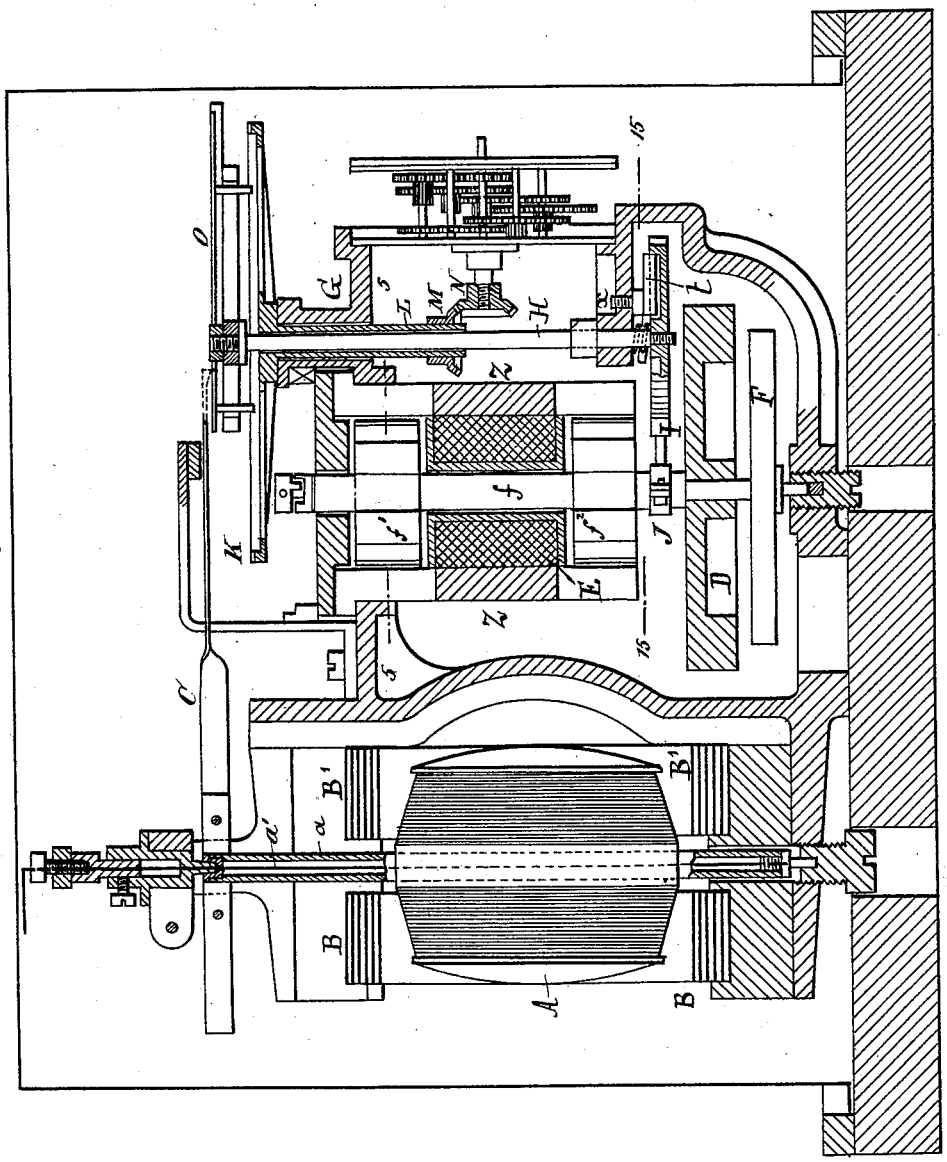
Figure 19:
Figure 2:
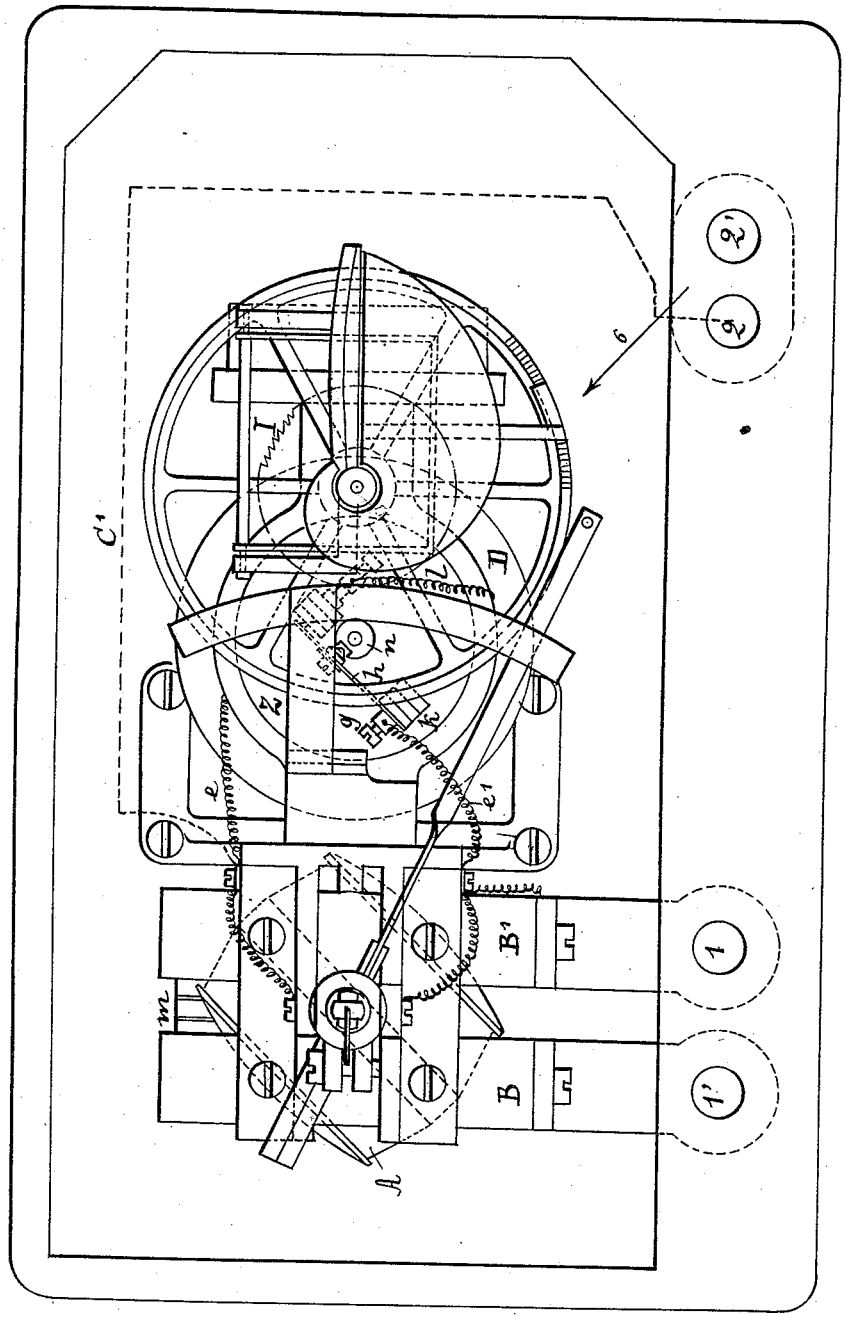

In the accompanying drawings, Figure 1 is a vertical longitudinal section of my improved electric meter. Fig. 2 is a plan thereof. Fig. 3 is a transverse section showing the registering apparatus in end elevation. Fig. 4 is an elevation of the opposite end of the apparatus, partly in section. Fig. 5 is a horizontal section through the impelling magnet of the clock-work, cut on the line 5 5 in Fig. 1. Fig. 6 is an elevation of the circuit-breaker for the clock-work, on a larger scale, looking in the direction of the arrow 6 in Fig. 2. Figs. 7, 8, and 9 are plans of the circuit-breaker, showing the parts in three different positions. Fig. 10 is a front elevation, and Fig. 11 a rear elevation, of the fixed coils of the electro-dynamometer. Figs. 12 and 13 are vertical sections thereof, cut, respectively, on the lines 12 12 and 13 13 in Figs. 10 and 11. Fig. 14 is a plan of the apparatus, showing the electric connections diagrammatically. Fig. 15 is a horizontal section of part of the clock-work on the line 15 15 in Fig. 1. Fig. 16 is a vertical section showing in elevation by dotted lines the wheel-work of the register. Figs. 17 and 18 are respectively an elevation and plan of the clutching device for coupling together the meter and register at intervals, these views corresponding, respectively, to to Figs. 13 and 14 of my said previous patent. Fig. 19 is an elevation, and Fig. 20 a horizontal section, of the tubular fixed armature Z of the impelling-magnet E of the clock-work.

As in my original instrument, the electro-dynamometer is constructed of two solenoids, one of which A is wound with fine wire of high resistance and movable around a vertical axis $a$, which is mounted on a tubular arbor traversed by a wire $a'$, which serves both as a suspension-wire and as a torsional spring. This solenoid is traversed by a derived current passing outside of the subscriber's circuit or loop. The current in this solenoid is consequently proportional at each instant to the difference of potential between the two extremities of this derived circuit. The other solenoid is formed of two fixed coils B B', arranged symmetrically in vertical planes. These two coils are shown in Figs. 10 to 13. The two coils B B' are wound in opposite directions, as best shown in Figs. 12 and 13, which show the two coils, respectively, and they are interconnected by a conductor $m$, which joins their inner ends. Their outer ends are carried downwardly and connected by screws to the binding-posts 1' 1, respectively. The two coils are thus connected in series with each other. The action of the fixed solenoid B B' and the movable solenoid A is the same as formerly and requires no description.

The electric current circulates as follows: The coils B and B' are connected to one of the terminals of the station by the binding-post 1, and to the subscriber's circuit by the binding-post 1'. The binding-posts 2 and 2', which are interconnected through the interior of the apparatus, receive indifferently the one the second wire of the station and the other the other end of the subscriber's circuit. The entire current of the subscriber passes thus through the fixed coils. The fine wire of the solenoid A is connected in derivation between the binding-posts 2 and 1 by means of the electric connection C'. The circuit arrangements are best shown in Fig. 14.

The axis of the movable solenoid-coil A carries an arm or needle C, which is deflected to a greater or less angle from its position of rest, according as a greater or less current is traversing the solenoid-coils. At the end of each predetermined interval of time, determined by the clock-work, the register is engaged by the clock-work and driven therewith for a greater or less distance proportionally to the greater or less deflection of the needle. This is accomplished through the cam-plate O, pawl $z'$, and wheel K, (shown in in Figs. 17 and 18,) and the operation of which is already known, or may be studied by reference to my said previous patent.

The clock-work consists of a balance-wheel D on a vertical axis, provided with a spiral spring F and beating seconds. Its movement is produced and maintained electrically by some novel means. The arbor $f$ of the balance-wheel D (shown in Figs. 1 and 5) is of iron with two, three, four, or six wings at or near its opposite ends. This arbor oscillates freely in the axis of the fixed coil E and constitutes, with this coil, an electro-magnet, the poles of which are at $f'$ and $f^2$. The coil E is inclosed in a fixed vertical cylindrical tube of iron Z, the upper and lower extremities of which are notched, as shown in Fig. 5, in such manner as to form a certain number of spaces equal to the number of wings on the arbor $f$ of the balance-wheel—six, for example, as shown in the drawings.

Referring to Fig. 14, the connection between $e$ and the coil E is established directly; but the communication of this coil with $e'$ takes place through the intermediation of a spring-contact arranged as follows: A screw $g$, insulated from the mass, is in contact with a spring $h$, the free end of which is arranged to play against a contact-point $i$ on an adjusting-screw $j$, as shown in Figs. 2, 6, and 7. The screws $g$ and $j$ are insulated, their supports being integral with the ebonite frame $k$. The screw $j$ is connected to a conductor $l$, which is joined to the coil E. The upper part of the arbor $f$ of the balance-wheel carries the head $n$, which has a notch or recess $o$, in which works the tooth $p$ on the spring $h$. When the tooth enters this notch, the free end of the spring touches the point $i$ and the circuit is closed. Underneath the head $n$ is another head $q$, loose on the arbor $f$ and having a notch $o'$ of greater width than the notch $o$ in the head $n$, as shown in Figs. 6 and 7. The head $n$ carries a tooth $r$, which plays in a space $s$ in the loose head, this space being wider than the tooth. It is by the abutment of this tooth $r$ that the arbor drives the loose head when the balance-wheel oscillates. In the position of rest the balance-wheel is fixed to its spiral in such manner that the wings on the arbor $f$ correspond to the spaces of the fixed armature Z. In this position of rest the axis of the notch $o$ of the head $n$ (see Fig. 7) coincides with the position of the tooth $p$. When the current passes, the arbor $f$ is displaced. One edge of the notch (the right, for example, Fig. 7) lifts the tooth $p$. The circuit being thus interrupted, the arbor $f$ of the balance-wheel turns backward under the action of the spiral spring, and a certain time passes before the attraction is re-established to impel it forward. The balance-wheel thus executes oscillations which increase until the moment of crossing the point where the wings on the arbor $f$ coincide with the spaces between the teeth of the fixed armature Z, when the balance-wheel is attracted to the other side of the tooth $p$. It is then the left-hand edge of the notch which lifts $p$, and the oscillation takes place with an amplitude at least equal to the width of the notch $o$ in the head $n$. Since the key falls at each passage of the notch $o$, the balance-wheel receives two impulses to each double oscillation. With a sufficiently-strong current the oscillation which results from each impulse might attain an exaggerated value, to limit which is the purpose of the loose head $q$. In the position of equilibrium after a normal stoppage by oscillations slowly decreasing, the notch $o$ of the head $n$ and the notch $o'$ of the head $q$ and the space $s$ in this same head are symmetrically arranged with reference to the tooth $p$ and the axis of the balance-wheel. For oscillations no greater than the width of the space $s$, it is clear that the loose head $q$ is not driven. Upon the oscillation increasing from the width of $s$ to this width augmented by the width of $o'$ the loose head $q$ is driven; but there are then less than two impulses to each oscillation, since the extreme edges of $o'$ do not pass under the tooth $p$. If the oscillation exceeds the sum of the widths of $s$ and $o'$, the edges of $o'$ come into action to hold up the tooth $p$. If the width of $s$ is such that on the return the notches $o$ and $o'$ cross each other, the impulses are suppressed, since the two heads $n$ and $q$ together no longer present any space, as shown in Figs. 8 and 9, which show oscillations in the directions indicated by the arrows. On the contrary, the balance-wheel is impelled by the current when the oscillation diminishes sufficiently so that the heads $n$ and $q$ bring their notches $o$ and $o'$ into coincidence. When the current ceases, the oscillations continue diminishing slowly for the two heads. The movable head $q$ stops first in a position symmetrical with reference to the tooth $p$, and the fixed head $n$ stops in its oscillation with its axis coincident with the position of the tooth. The apparatus rests thus in position ready to start.

The oscillations imparted by the electro-magnet to the arbor $f$ are utilized to drive the clock-work in the same manner as heretofore—namely, an eccentric on the lower portion of $f$ imparts motion to an anchor J, carried thereby, one arm of which terminates in a pallet or pawl $u$, which enters the teeth of a wheel I, and when thrust forward by the eccentric advances this wheel the distance of one tooth. This wheel I, I call the "wheel of one hundred teeth." It is fixed on a vertical arbor H, the upper end of which carries the cam-plate O, which plate is consequently revolved at predetermined intervals of time—for example, once every one hundred seconds. When the needle is in contact with the cam-plate, it couples the latter to the wheel K. This wheel is fastened on a tubular shaft L, preferably concentric with the arbor H, which carries the miter-gear N, which drives the register-train. This train, which is shown in Fig. 16, is the same as heretofore. The register is carried by a frame G, which forms part of the general frame of the meter.

In order to prevent the turning backward of the hundred-toothed wheel I, I arrange, as shown in Fig. 15, in the interior of this wheel a friction-pawl $t$, pivoted at $x$ and pressed by a spring $r'$. This pawl permits the movement of the wheel I in one direction while serving as a brake to stop its movement in the other direction. The operation is substantially the same as that of the apparatus described in my first patent.

Figure 20:
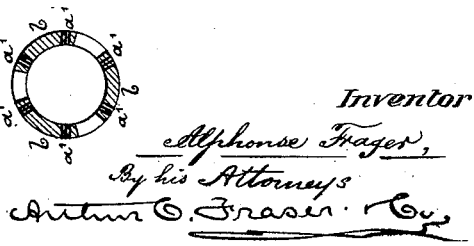

The exterior cylindrical armature Z may be advantageously constructed in the manner shown in Figs. 19 and 20. Instead of being formed of a tube of soft iron and notched, it is constructed of six groups of soft-iron plates $a''$, connected by a non-magnetic metal $b$—type-metal, for example. The effect of this construction is to diminish the cost of manufacture and to re-enforce the motive effect by suppressing the branching of the magnetic lines of force, which takes place in the arrangement first described by reason of the uninterrupted body portion intervening between the teeth.

I claim as my invention the following-defined novel features or improvements, substantially as hereinbefore specified, namely:

1. In an electric meter, an electro-dynamometer consisting of a movable coil connected in derivation, and two fixed coils arranged exterior to the movable coil to act inductively thereupon, and the fixed coils wound in opposite directions, connected together at their inner ends and connected at their outer ends to the circuit-wire carrying the current to be measured, whereby the entire current to be measured traverses them serially.

2. In an electric meter, the combination, with a clock-work, of an electro-magnet for impelling it, consisting of a coil, an arbor passing through the axis of the coil and mounted to oscillate and formed with radial wings beyond the ends of the coil, and a fixed armature exterior to the coil, formed with teeth equal in number to said wings and projecting into inductive proximity thereto.

3. In an electric meter, the combination, with a clock-work, of an electro-magnet for impelling it, consisting of a coil, an arbor passing through the axis of the coil, mounted to oscillate and formed with radial wings beyond the ends of the coil, and a fixed armature exterior to the coil, consisting of plates of soft iron, arranged in as many groups as the number of said wings and projecting beyond the ends of the coil to bring their ends into inductive proximity to the wings, and intervening portions of non-magnetic material for holding the groups of plates in place.

4. In an electric meter, the combination, with a clock-work, of an impelling-magnet for driving it, an oscillating arbor carrying the balance-wheel of the clock-work, and a circuit-breaker operated by said arbor to close the circuit through said magnet under normal conditions twice to each double oscillation of the arbor, whereby the arbor receives impulses from the magnet in both directions.

5. In an electric meter, the combination, with a clock-work, of an impelling electro-magnet for driving it, an oscillating arbor carrying the balance-wheel of the clock-work and having a fixed head with a recess or notch, a circuit-breaker having a tooth entering said notch and operated thereby, and a loose head having a similar notch for engagement with said tooth and constructed to be driven by the arbor with a suitable degree of lost motion, whereby during normal operation the two notches coincide and the circuit-breaker is closed at each oscillation, but in case of an abnormal oscillation the loose head is driven to bring its notch out of coincidence with that in the fixed head, whereby the closing of the circuit is prevented until the oscillations are reduced to the normal amplitude.

In witness whereof I have hereunto signed my name in the presence of two subscribing witnesses.

ALPHONSE FRAGER.

Witnesses:
R. J. PRESTON,
ARMENGAUD, Jeune.